United States Patent
Danieli

(10) Patent No.: US 7,464,272 B2
(45) Date of Patent: Dec. 9, 2008

(54) SERVER CONTROL OF PEER TO PEER COMMUNICATIONS

(75) Inventor: Damon V. Danieli, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 10/671,397

(22) Filed: Sep. 25, 2003

(65) Prior Publication Data

US 2005/0071481 A1 Mar. 31, 2005

(51) Int. Cl.
*H04K 1/00* (2006.01)

(52) U.S. Cl. .................... 713/182; 713/169; 726/1; 726/2; 726/4; 726/5; 726/9; 380/251

(58) Field of Classification Search ............... 713/169, 713/182; 726/2, 4, 27, 9, 1, 5; 707/9; 463/42; 709/204, 223, 227; 380/251
See application file for complete search history.

(56) References Cited

U.S. PATENT DOCUMENTS

| | | | | |
|---|---|---|---|---|
| 5,586,257 | A * | 12/1996 | Perlman | 463/42 |
| 6,322,451 | B1 * | 11/2001 | Miura | 463/42 |
| 6,845,389 | B1 * | 1/2005 | Sen et al. | 709/204 |
| 2002/0013811 | A1 * | 1/2002 | Kim | 709/203 |
| 2002/0193162 | A1 * | 12/2002 | Walker et al. | 463/42 |

OTHER PUBLICATIONS

B. Clifford Neuman and Theodore Ts'o, "Kerberos: An Authentication Service for Computer Networks" from IEEE communications Magazine, vol. 32, pp. 33-38, Sep. 1994.*

Becker, David. *CNET News*. Sep. 23, 2003. "Microsoft touts communications services." 4pp. Available: http://news.com.com/2100-1012-5081180.html.

*The Mercury News*. Sep. 24, 2003. "Microsoft's MSN to end most chat, scaling it back in U.S." 2pp. Available: http://integrate.factiva.com/search/article.asp?.

*Business Wire*. Jan. 18, 1999. "Combined Voice-Over-IP, Bar-code Scanning and Radio Technologies." 3pp. Available: http://ipbridge.nerac.com/caccess/WNDABSM?SESSION=D716C8B10054E23F&STITEM=0001&APP=S . . . .

Business Communications Company, Inc. Newsletter. Oct. 1, 1997. "PhoNet Has Voice Over IP Solution." 5pp.

Symbol Technologies Inc. Newswire. Jan. 18, 1999. "Symbol Technologies Announces NetVision Data Phone for Advanced Wireless Voice and Data Communication." 4pp.

(Continued)

*Primary Examiner*—KimYen Vu
*Assistant Examiner*—Baotran N To
(74) *Attorney, Agent, or Firm*—Workman Nydegger

(57) ABSTRACT

A server provides a secure environment for establishing peer-to-peer communications between clients. When two clients of the server wish to establish peer-to-peer communication, they first connect to the server. The server authenticates each client and provides information to authenticated clients to enable them to establish peer-to-peer communication. Any client who abuses the peer-to-peer communication privileges can lose the right to be authenticated. In an exemplary embodiment, the server is a game server and the clients joining in playing games, preferably using voiced-based peer-to-peer communication. Different levels of authorization may be granted to different clients, to limit the interaction between clients.

13 Claims, 11 Drawing Sheets

OTHER PUBLICATIONS

Zsigo, Konstantin. *Wireless Review*. Jan. 1, 1999. "From WIN to IP." 4pp.

Giuhat, Micaela. *Telecommunications Americas*. Oct. 1, 2002. "In control: session controllers key to SIP services at the edge." 36:11. 6pp.

Carlson, Caron and Paula Musich. *eWeek*. Feb. 24, 2003. "Controlling Net Traffic: Allot, Packeteer boost appliances to . . ." 20:8. 11pp.

*InternetWeek*. Jan. 8, 2001. "European Firm Cuts Costs With Voice Over IP." 4pp.

Dragan, Richard V. *PC Magazine*. Jan. 8, 2001. "Shared Space." 2pp.

* cited by examiner

SERVER CONTROL OF PEER TO PEER COMMUNICATIONS

FIELD OF THE INVENTION

The present invention generally relates to peer-to-peer computing, and more specifically, pertains to using a server to authenticate authorized clients and to enable peer-to-peer communications between authenticated clients to be established.

BACKGROUND OF THE INVENTION

It is now common for users of electronic devices to electronically interact with other users and participate in group activities, including chat sessions, instant messaging, collaborative work projects, and multiplayer games. In particular, voice communication for gaming and other electronic activities is becoming increasingly popular for individuals connected over the Internet or other network. For those participating in multiplayer games, voice communication greatly expands the depth of enjoyment and social interaction between players of a game.

In many such applications, it is possible for users to remain anonymous while participating in groups, thereby reducing any apprehension about participating in sensitive group discussions, offering unconventional ideas, or taking other socially risky actions that the user might not otherwise take if the user's identity were known to others in the group. Thus, interaction with other users through such electronic communities and group sessions often enhances both an individual user's and the group's productivity, educational experiences, and entertainment.

Unfortunately, abuse of open forums often destroys the usefulness and enjoyment of such public forums for all but a select few. For example, the adoption of public Internet communication directories has been hampered (if not destroyed) by "adult material." Experience has shown that when a directory of members in a group is publicly available for use, "adult" companies use such directories for advertising or transmitting sexually explicit material. Not only does the content of such advertising drive some users away, the experience of hosts for groups maintaining such directories has been that the sheer volume of such adult advertising targeting members of the group is so high that users interested in establishing a dialog relating to other topics have difficulty identifying legitimate members who are actually interested in non sexually explicit topics. At one time Microsoft Corporation maintained public Internet Lookup Service (ILS) directories for peer-to-peer communications on Microsoft company servers. After the initial release, adult material started showing up in larger and larger volumes, until the majority of the content in the directories related to sexually explicit material rather than the original topics of interest. This unwanted material so negatively impacted the usefulness of such directories for their intended personal or business communication use that Microsoft Corporation terminated the directory service.

Even when the majority of members in an online community adhere to defined or tacit codes of conduct, there is little that a community of users can do on their own to implement and enforce standards of conduct among the participants. Of course, if the communications of the electronic group are under the overall control of a third party host, the host can establish community standards and intervene when required. This approach works well in a conventional client/server environment, where individual members are each clients of a server, and communications between clients are managed by the server and the host who sufficient authority to control client use of the environment. Online game play is a prime example of this paradigm, because each gamer is a client of the game server. As long as the game server(s) provide communication services, text and/or voice, between different players, the host can exert control by controlling client access to the server(s). In a similar fashion, it would be desirable to provide a method and system for producing a trusted environment that facilitates the establishment of peer-to-peer communications amongst individual users.

Particularly when the primary role of a server is other than managing communications between clients, the aggregate volume of communications between clients can grow so large so as to place an undesirable burden on the server. In the example of the server hosting online game play, the amount of server overhead required to manage voice communications between players can be significant.

For example, massively multiplayer games are hosted by a large, centralized server (or group of servers) to which many thousands of clients may be connected. The centralized server is responsible for the "world state" and the client (i.e., the player's computer or game console) is responsible for the display of the world from that player's viewpoint, which is typically only a small portion of the entire world view. The client continuously sends the player's input and state to the server. The server updates the world and continuously returns new world information to the client.

Currently, all known massively multiplayer game networks route all communication through the central server. That is, if Player A wants to send a text message with Player B, Player A sends the message to the server and the server relays that message to Player B. There are many good reasons to do this:

With text chat, the additional bandwidth does not pose significant server overhead;
Peer-to-Peer connections take time to establish;
Peer-to-Peer connections may not work without additional help from the server;
"Fanning" the message to multiple players is efficiently done on the server; and
The sending player's IP address is "hidden" from the receiving player.

However, voice chat requires significantly more bandwidth than does text chat, and thus, adding voice chat capability to massively multiplayer game networks becomes an immense burden on the central server hosting the game. It would therefore be desirable to provide a system and method for enabling game servers to facilitate peer-to-peer communications between players to reduce demands on server resources, while still providing a secure environment from which such peer-to-peer communications can be initiated.

SUMMARY OF THE INVENTION

The present invention is directed to a method and system for providing a trusted environment that facilitates the establishment of peer-to-peer communications between users having access to the trusted environment. Specifically, a server provides a trusted session environment for users by ensuring that each user meets certain standards before being allowed access to the server. The server hosts a session, and checks the credentials of each user attempting to access the session, such that only users whose credentials are approved by the server are admitted to the session. During the session, users are allowed access to a list that identifies one or more other users currently approved by the server. Preferably, the list includes users who are currently accessing the session. A first user selects a second user from such a list and requests the server to provide information to facilitate a peer-to-peer connection that will be formed between the first and second users. The server transmits the information required to the first user, who then attempts to establish a peer-to-peer communication link with the second user. If the attempt fails, the first user informs the server of the failure, and the server then sends information to the second user, so that the second user can attempt to establish the peer-to-peer communication.

A server may simultaneously host different sessions, and users may have access to less than all of those sessions, based on a level of access granted to individual users. For example, the server can be hosting a plurality of different gaming sessions, and each user could be restricted to communicating only with other users accessing the same game session.

The information provided by the server to facilitate the establishment of peer-to-peer communications includes a user's external IP address, any internal IP address associated with the user, and any port address associated with the user. Preferably, as each user accesses the server, a unique user key is assigned to that user by the server. The user key is then added to the information provided by the server, thereby assuring users receiving a request to accept a peer-to-peer connection that the request comes from a trusted source.

In one embodiment, the server hosting the secure session has a core functionality that is different than facilitating peer-to-peer communications between users. A preferred implementation of this embodiment is a networked gaming environment, where the server hosts multiplayer gaming. A primary function of the server is to host a game, and the facilitation of peer-to-peer communications is an enhancement to the gaming environment.

In another embodiment, the core function of the server is to provide a secure environment in which users can establish peer-to-peer communications amongst themselves. In an implementation of this second embodiment, the server authorizes individual access to different sessions or subsets of the service, based on the user's credentials or interests. If complaints are received from other users about the conduct of an individual user, the server can ban that user from future sessions.

Another aspect of the invention is directed to a memory medium that stores machine instructions for carrying out the steps described above and in accord with the present invention, as discussed in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 3:
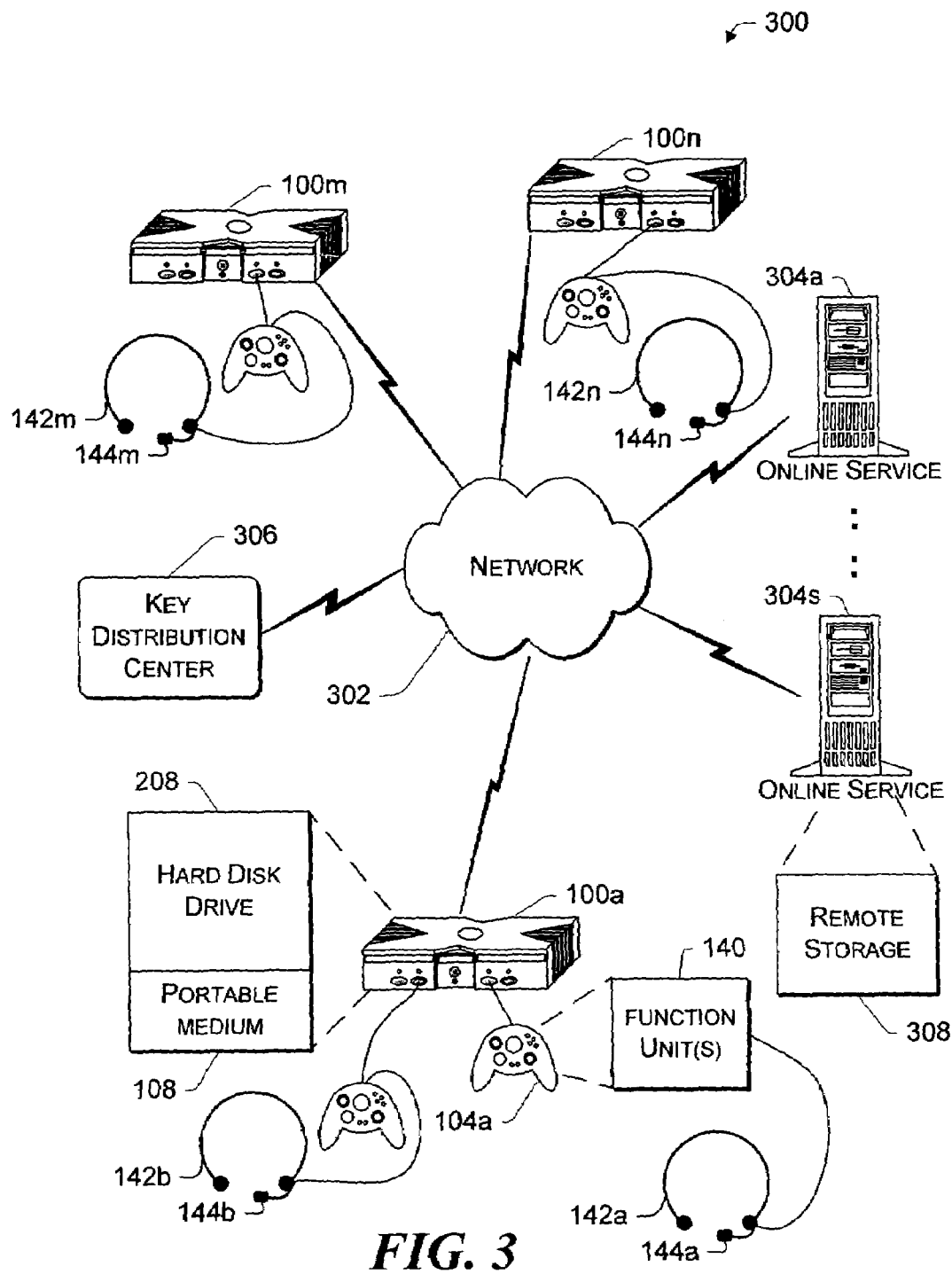
FIG. 3 shows an exemplary network gaming environment that interconnects multiple gaming systems via a network.
Figure 5:
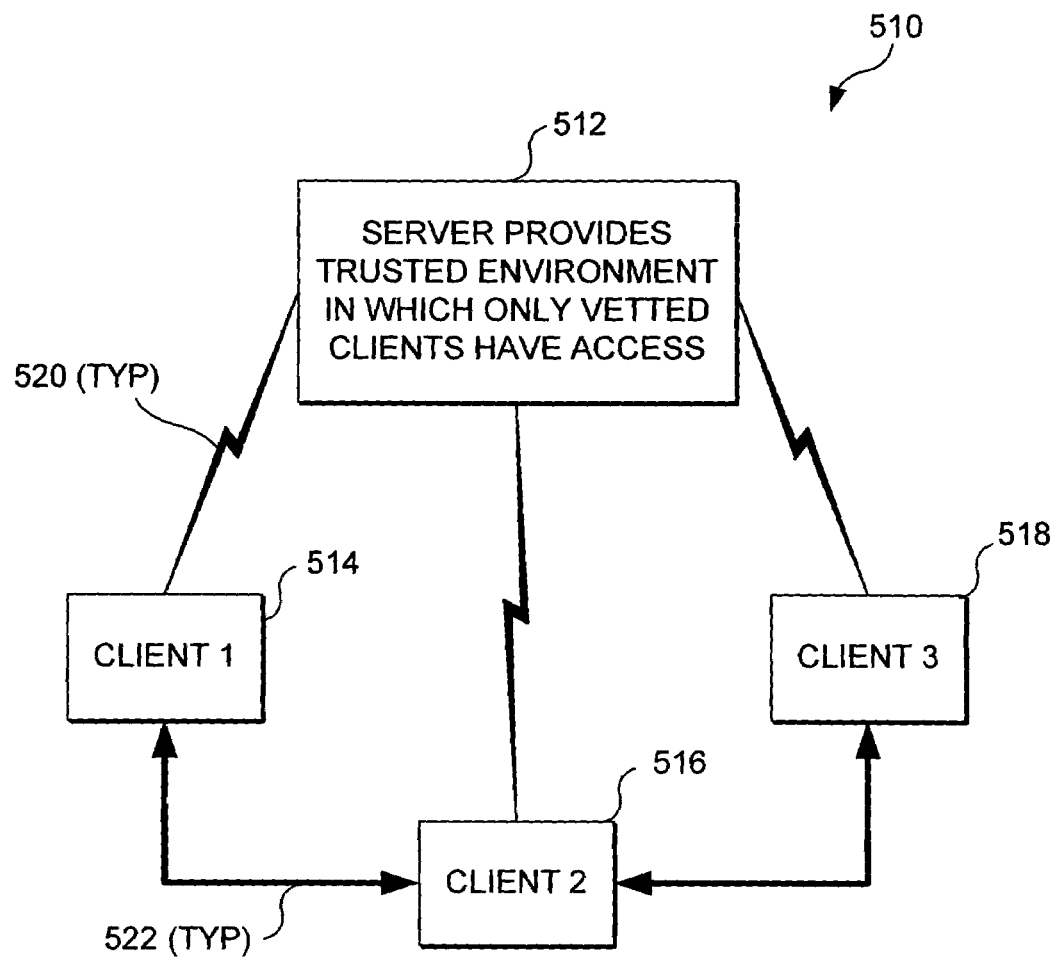
Figure 6:
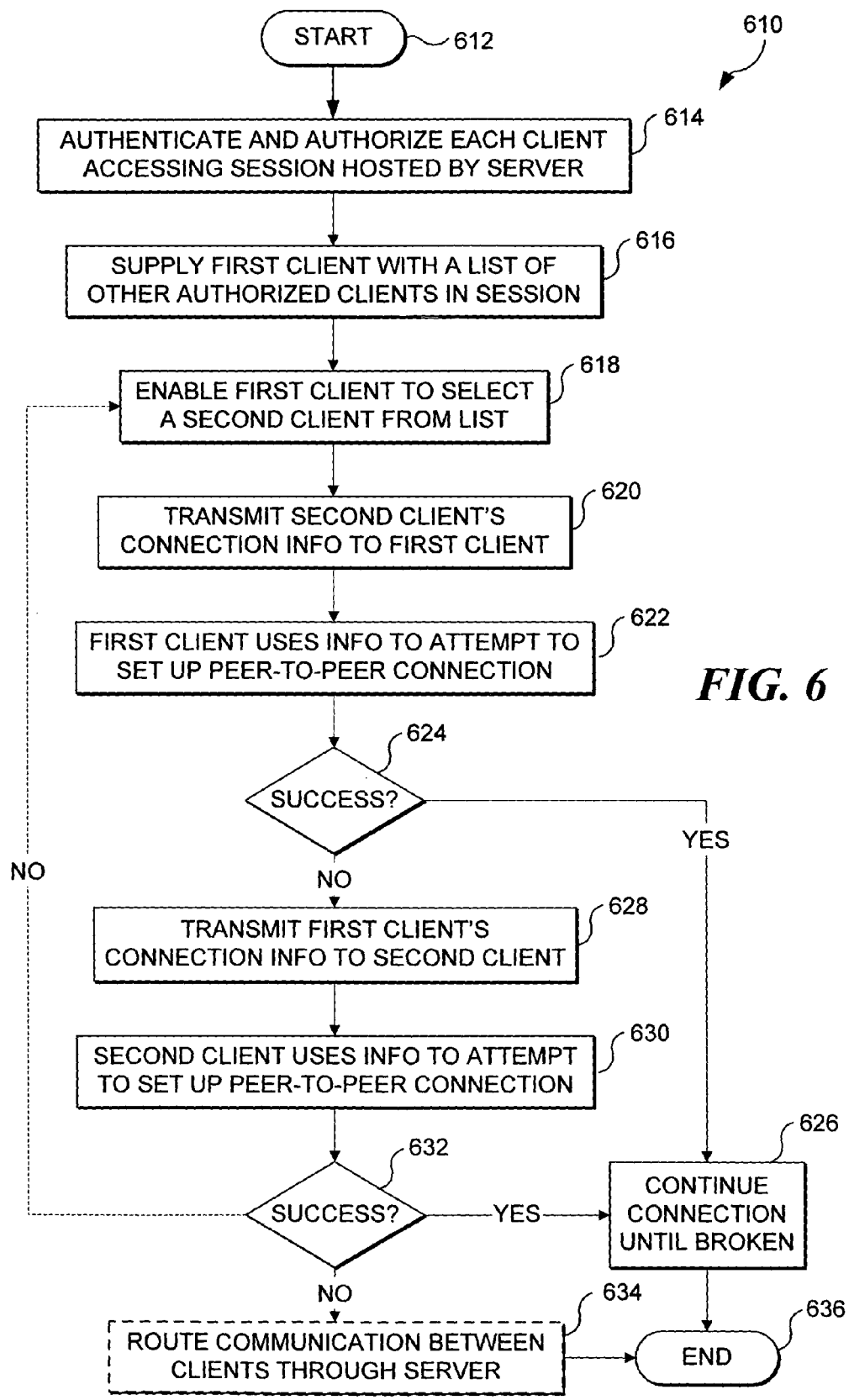
Figure 7:
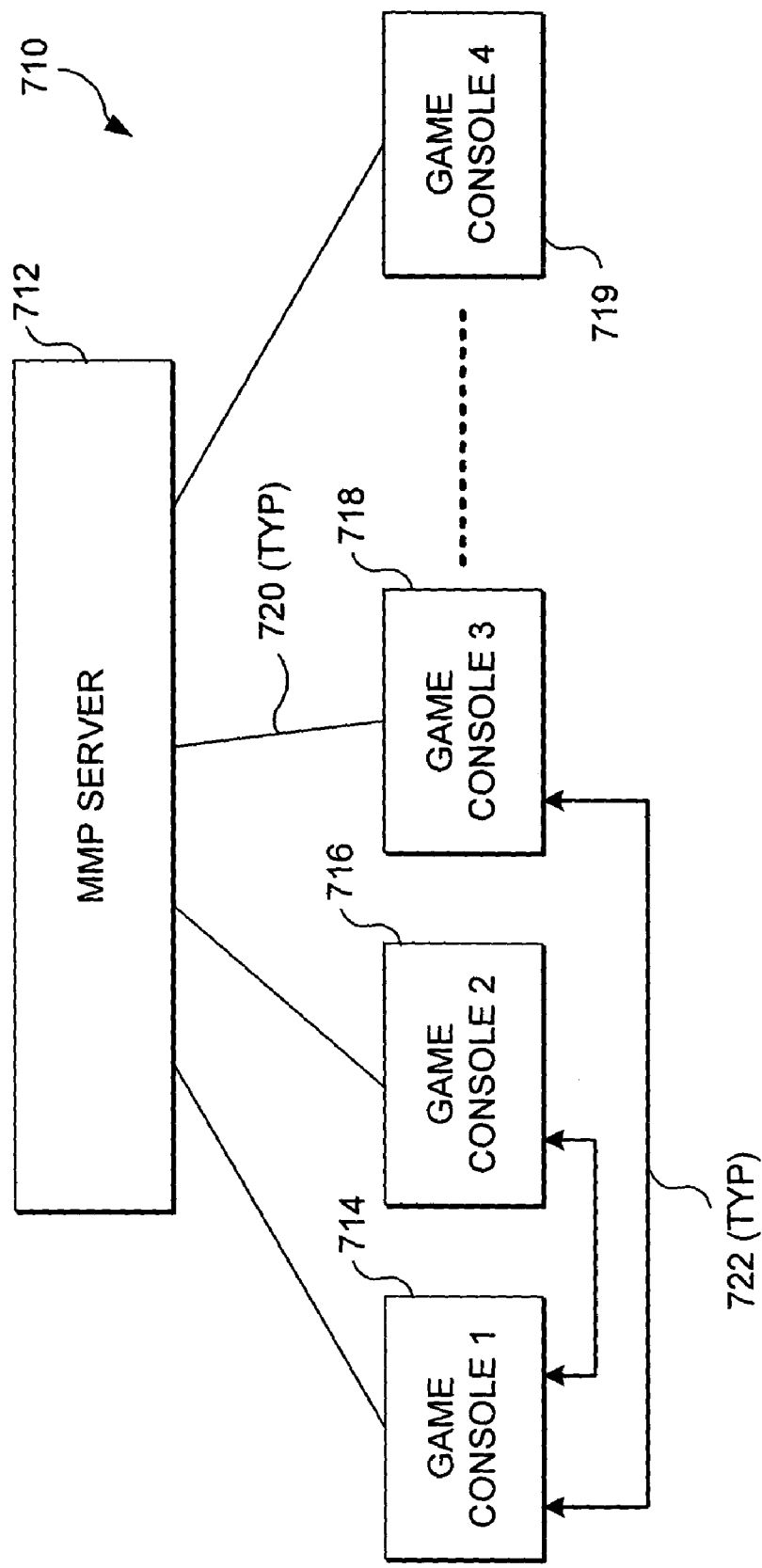
Figure 8:
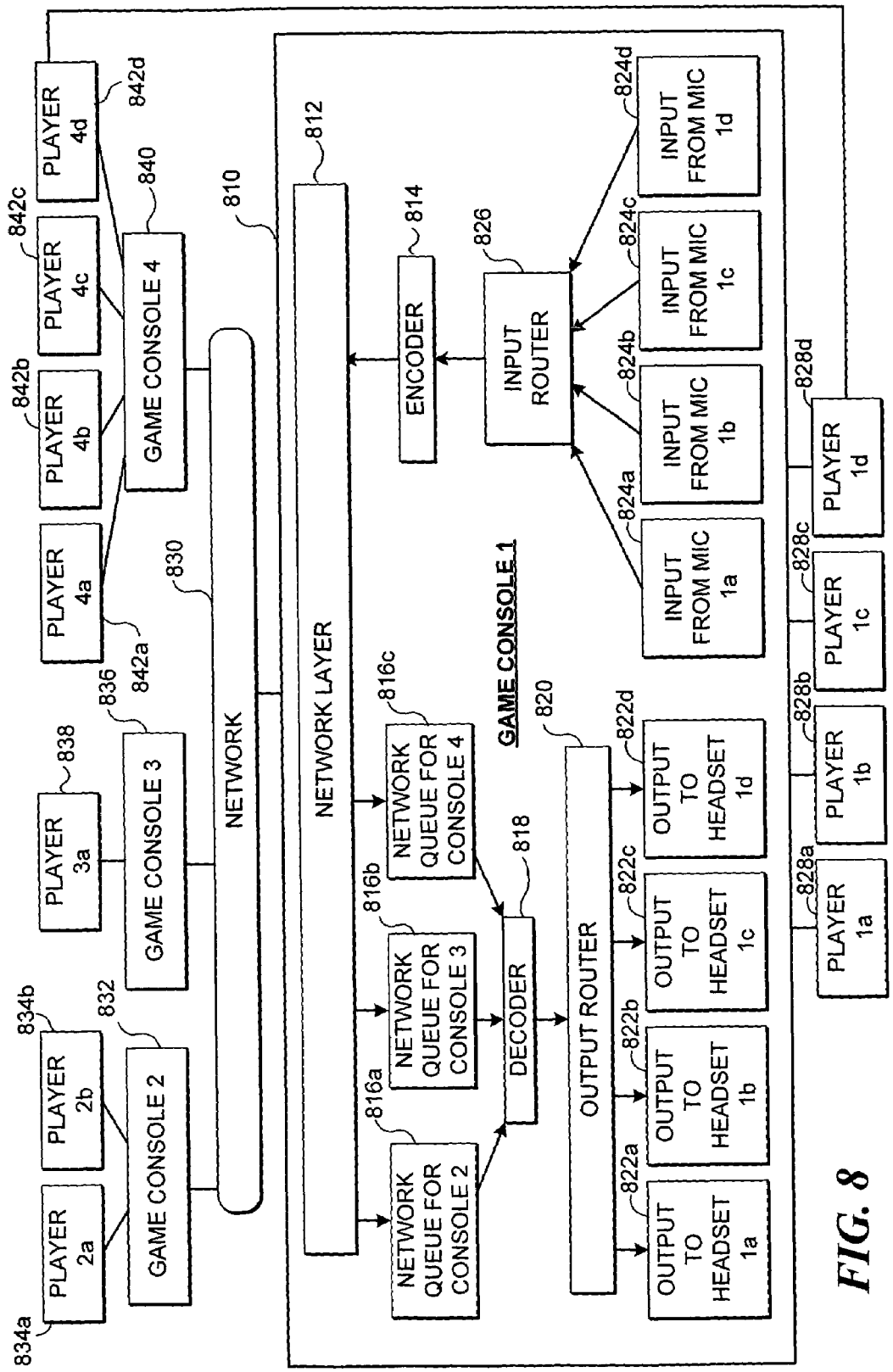
Figure 9:
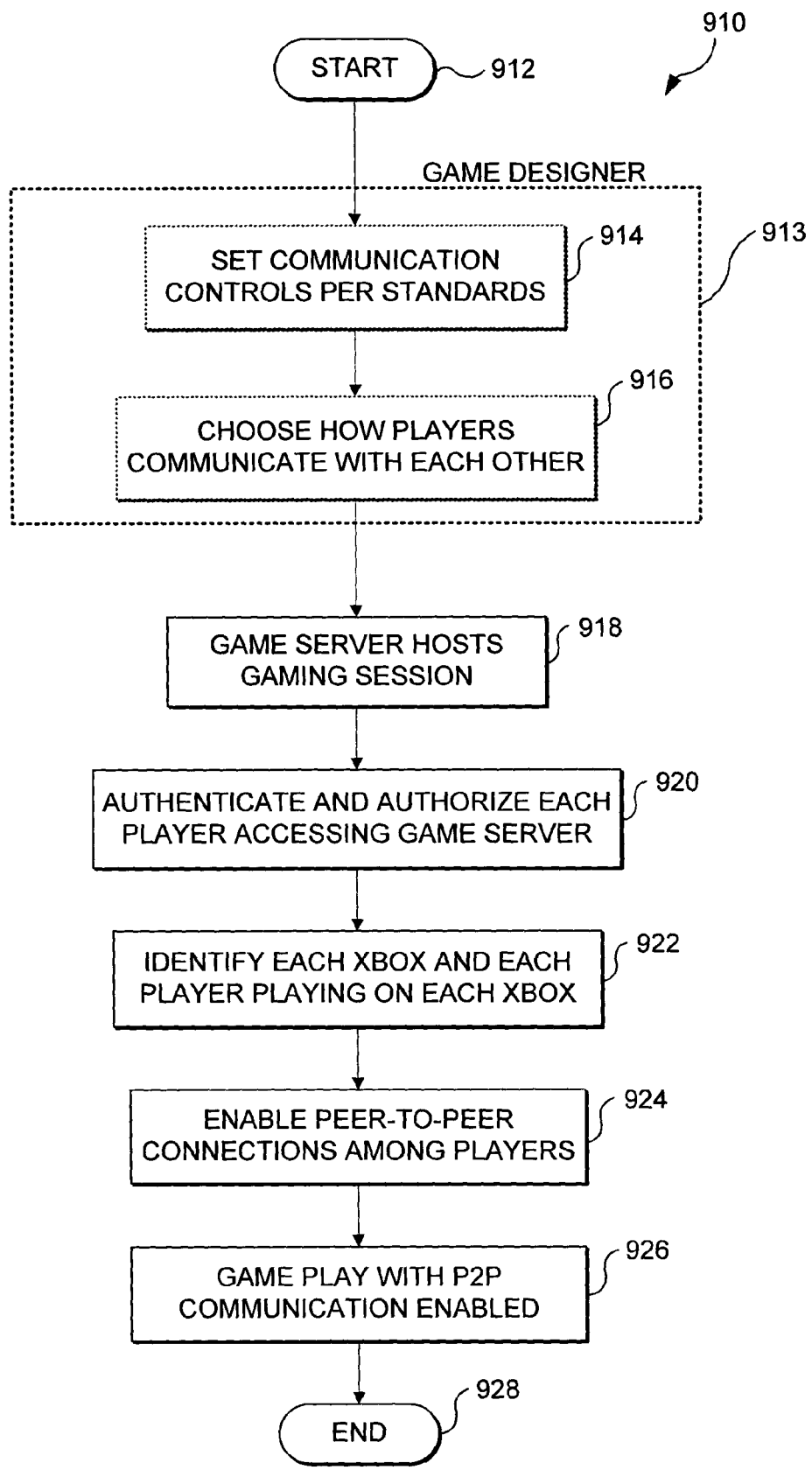
Figure 10:
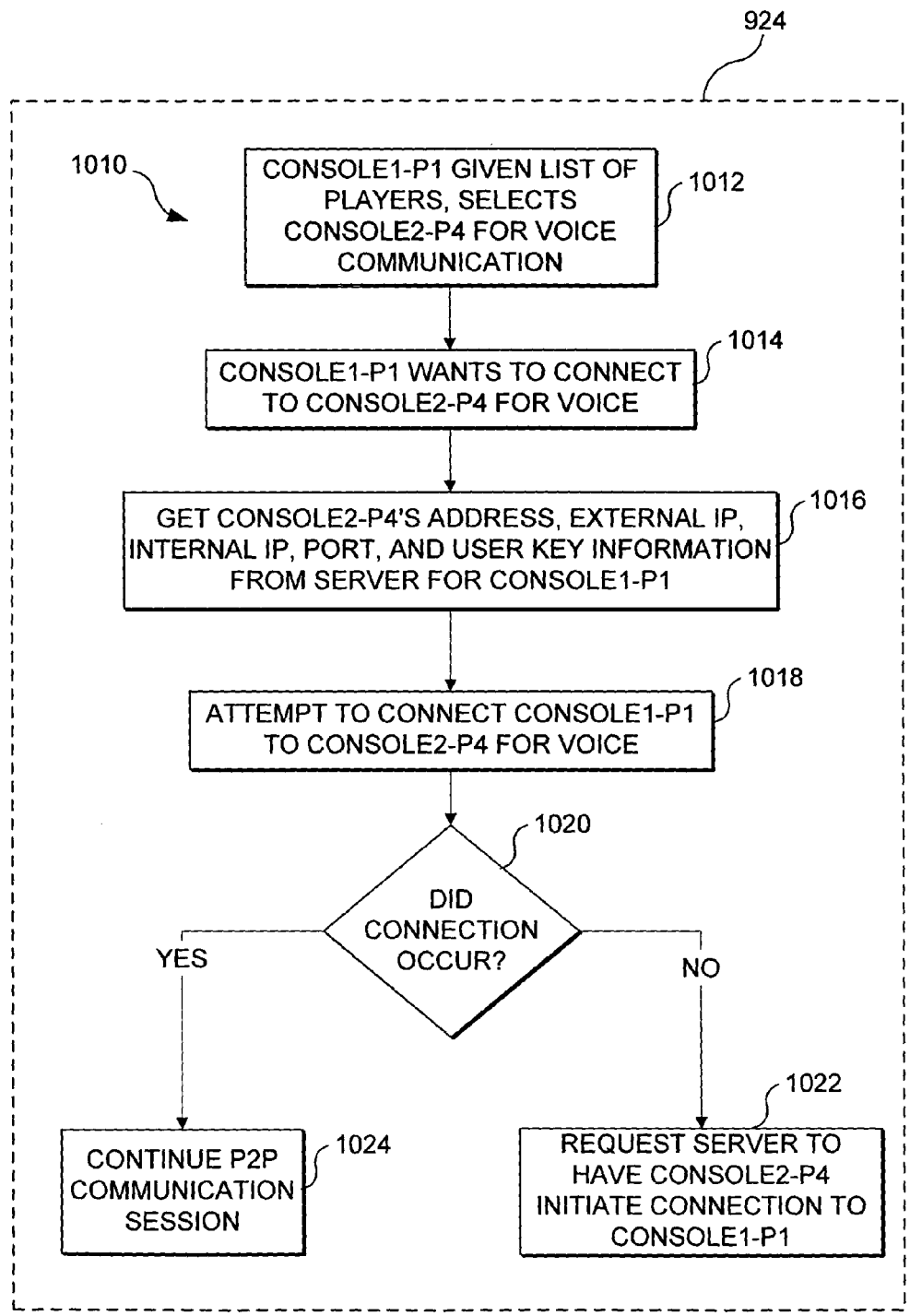
Figure 11:
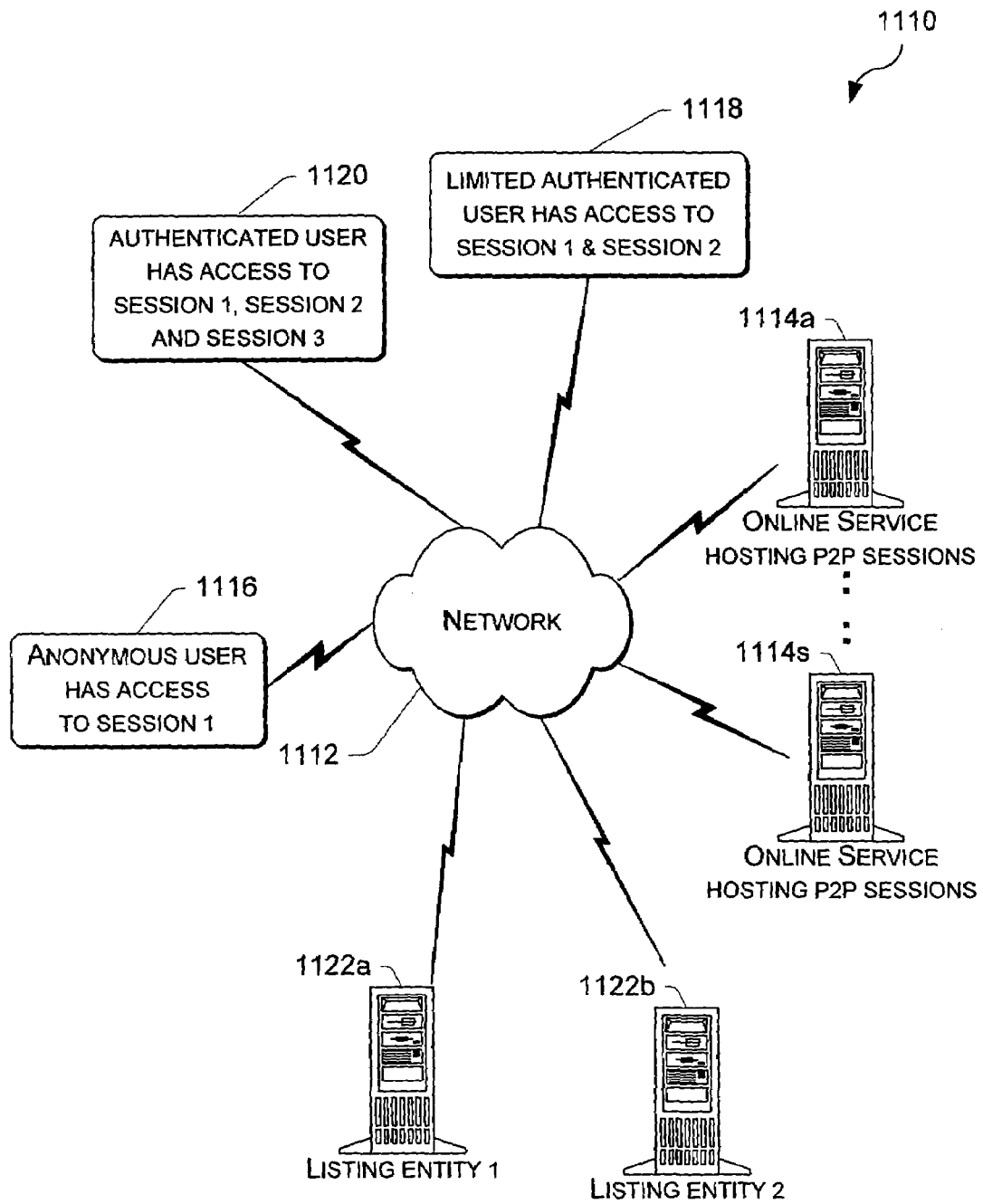

FIG. 5 schematically illustrates a server providing a trusted environment that facilitates the establishment of peer-to-peer connections between clients of the server;

FIG. 6 is a flow diagram showing the logic used in the present invention for enabling a server to provide a trusted environment that facilitates the establishment of peer-to-peer connections between clients of the server;

FIG. 7 is based on FIG. 5, and illustrates a preferred embodiment of the invention in which the server is a game server, and each client is a player;

FIG. 8 is a functional block diagram showing components of the exemplary network gaming environment of FIG. 3 in greater detail;

FIG. 9 is a flow diagram illustrating the logic used by a game server to facilitate peer-to-peer communications among players during game play;

FIG. 10 is a flow diagram illustrating additional details relating to the logic used by the game server to facilitate peer-to-peer communications among players; and FIG. 11 is a schematic diagram of an exemplary network including hosting servers whose core function is facilitating the establishment of peer-to-peer connections among clients, including different classes of clients having different access rights to the hosting servers.

DESCRIPTION OF THE PREFERRED EMBODIMENT

A preferred embodiment of the present invention uses a server to facilitate and exercise a degree of control over peer-to-peer communications between common clients. The server is not involved in monitoring or controlling the content of peer-to-peer communication in real-time, but authenticates and authorizes participants, who are then allowed access to others who have been similarly authenticated and authorized by the server. The server can be used to facilitate the establishment of a peer-to-peer communication link between authenticated users.

In a first primary embodiment of the present invention, the core functionality of the server is to provide some other functionality to clients, and the facilitation of peer-to-peer communications is a secondary function. In an example of the first embodiment, a primary function of the server is to host online game play, and the peer-to-peer communication enabled by the game server is provided to enhance the game players' experience.

In a second embodiment of the present invention, a core functionality of the server is to provide a trusted environment that facilitates peer-to-peer communications between trusted clients. In an example of the second embodiment, public Internet directories are established for facilitating peer-to-peer communications between members having shared interests. While such public Internet directories have existed before, previously, such directories were not established in a trusted environment, and quickly fell prey to abuse by purveyors of sexually explicit content, who rapidly crowded out other clients interested in the original purpose of the directory. In one form of this embodiment, the server provides a secure environment by enabling different "classes" of entities (anonymous users, authenticated users, businesses, universities, etc.) to be assigned different access rights that can be enforced in a secure fashion.

Because facilitating peer-to-peer communication in a networked gaming environment represents a preferred function of the present invention, the following description describes an exemplary gaming system. It should be understood that while the game server embodiment is initially a preferred application, the present invention is not limited to merely the game server embodiment described in detail herein, or to an embodiment in which a primary functionality of the server is other than the facilitation of peer-to-peer communications. The core concepts described herein and in the claims that follow apply to each of the embodiments, and the game server embodiment should be considered to only exemplary, rather than limiting of the present invention. Those skilled in the art will recognize that the present invention may be implemented using a variety of computing devices, including networked gaming systems. Thus, the present invention may also be implemented using set-top boxes, in arcade games, using hand-held devices, in connection with applications executed on personal computers (PCs), and in other networked systems in which there is a desire to facilitate peer-to-peer communications between trusted clients sharing a common server.

Exemplary Gaming System

Figure 1:
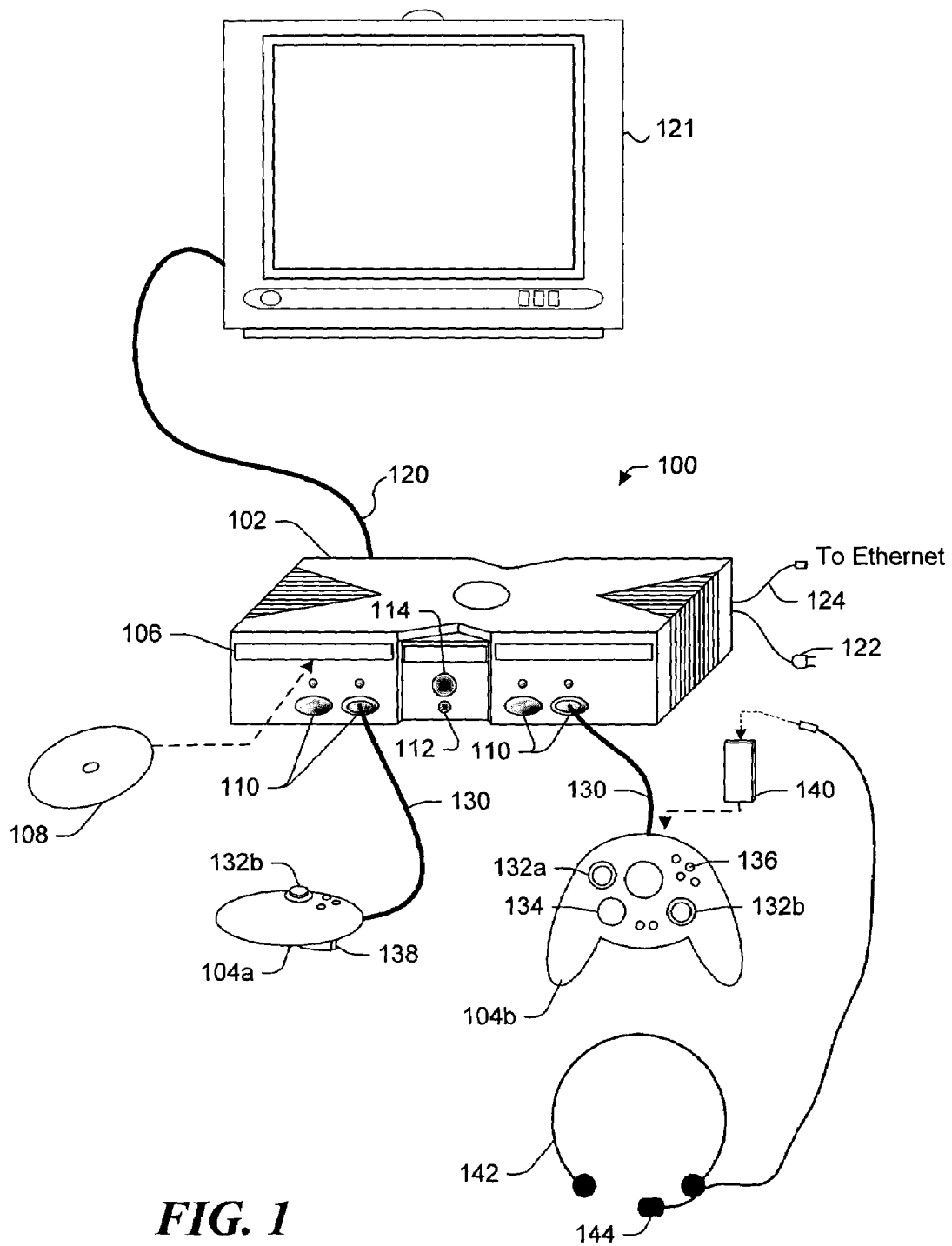
FIG. 1 illustrates an exemplary electronic gaming system that includes a game console and support for up to four user input devices.

As shown in FIG. 1, an exemplary electronic gaming system 100 that is suitable for practicing the present invention includes a game console 102 and support for up to four user input devices, such as controllers 104a and 104b. Game console 102 is equipped with an internal hard disk drive (not shown in this Figure) and an optical media drive 106 that reads various forms of portable optical storage media, as represented by an optical storage disc 108. Examples of suitable portable storage media include digital versatile discs (DVDs) and compact disk-read only memory discs (CD-ROMs). In this gaming system, game programs are preferably distributed for use with the game console on DVD discs, but it is also contemplated that other storage media might instead be used on this or other types of systems that employ the present invention.

On a front face of game console 102 are disposed four slots 110 for connection to supported controllers, although the number and arrangement of the slots may be modified as needed to support more or fewer controllers. A power button 112, and an eject button 114 are also disposed on the front face of game console 102. Power button 112 controls application of electrical power to the game console, and eject button 114 alternately opens and closes a tray (not shown) of optical media drive 106 to enable insertion and extraction of storage disc 108, so that the digital data on it can be read for use by the game console.

Game console 102 connects to a television 121 or other display monitor or screen via audio/visual (A/V) interface cables 120. A power cable plug 122 conveys electrical power to the game console when connected to a conventional alternating current line source (not shown). Game console 102 includes an Ethernet data connector 124 to transfer and receive data over a network (such as through a connection to a hub or a switch (not shown), or over the Internet, for example, through a connection to an xDSL interface, a cable modem, or other broadband interface (not shown). Other types of game consoles that implement the present invention may be coupled together or to a remote server, by communicating using a conventional telephone modem.

Each controller 104a and 104b is coupled to game console 102 via a lead (or alternatively through a wireless interface). In the illustrated implementation, the controllers are USB compatible and are connected to game console 102 via USB cables 130; however, it is contemplated that other types of data interfaces may instead be employed. Game console 102 may be equipped with any of a wide variety of user devices for interacting with and controlling the game software. As illustrated in FIG. 1, each controller 104a and 104b is equipped with two thumbsticks 132a and 132b, a D-pad 134, buttons 136, and two triggers 138. These controllers are merely representative, and other gaming input and control devices may be substituted for or added to those shown in FIG. 1 for use with game console 102.

A removable function unit 140 can optionally be inserted into each controller 104a and 104b to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. The circuitry of the voice communication unit may alternatively be integrated into the controller, and a headset with boom microphone may be removably or permanently connected to the controller. Preferably, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from a MU. For example, gaming system 100 is potentially capable of playing:

Game titles stored on CD and DVD discs read by the optical media drive, stored on the hard disk drive, or downloaded from an online source;

Digital music stored on a CD read by optical media drive 106, in a file on the hard disk drive (e.g., WINDOWS MEDIA AUDIO™ (WMA) format), or derived from online streaming sources on the Internet or other network; and Digital A/V data stored on a DVD disc read by optical media drive 106, or in files stored on the hard disk drive (e.g., in an Active Streaming Format), or accessed from online streaming sources over the Internet or other network.

Figure 2:
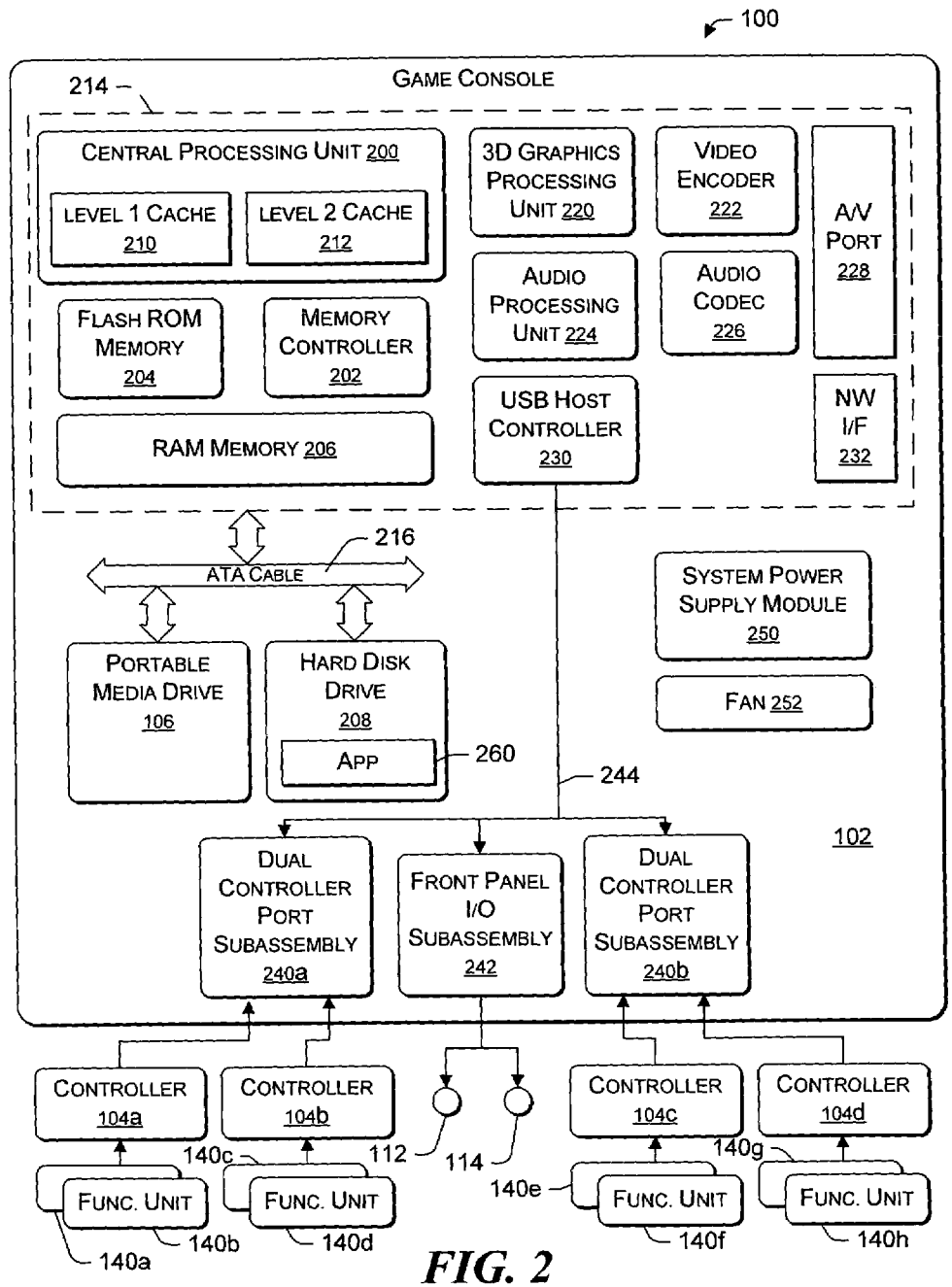
FIG. 2 is a functional block diagram showing components of the gaming system in greater detail.

FIG. 2 shows functional components of gaming system 100 in greater detail. Game console 102 includes a CPU 200, a memory controller 202 that facilitates CPU access to a read-only memory (ROM) 204, a random access memory (RAM) 206, a hard disk drive 208, and portable optical media drive 106. CPU 200 is equipped with a level 1 cache 210 and a level 2 cache 212 to temporarily store data so as to reduce the number of memory access cycles required, thereby improving processing speed and throughput of the gaming system. CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a micro channel architecture (MCA) bus, an enhanced ISA (EISA) bus, a Video Electronics Standards Association (VESA) local bus, and a peripheral component interconnect (PCI) bus.

As an example of one suitable implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple double data rate synchronous dynamic RAM modules (DDR SDRAM modules) that are independently controlled by memory controller 202 via separate buses (not shown). Hard disk drive 208 and optical media drive 106 are connected to the memory controller via the PCI bus and an advanced technology attachment (ATA) bus 216.

A 3D graphics processing unit (GPU) 220 and a video encoder 222 form a video processing pipeline for high-speed and high-resolution graphics processing. Data are conveyed from GPU 220 to video encoder 222 via a digital video bus (not shown). An audio processing unit 224 and an audio encoder/decoder (CODEC) 226 form a corresponding audio processing pipeline for high fidelity and stereo audio data processing. Audio data are conveyed between audio processing unit 224 and audio CODEC 226 via a communication link (not shown). The video and audio processing pipelines output data to an A/V port 228 for transmission to the television or other display monitor. In the illustrated implementation, video and audio processing components 220-228 are mounted on module 214.

Also implemented on module 214 are a USB host controller 230 and a network interface 232. USB host controller 230 is coupled to CPU 200 and memory controller 202 via a bus (e.g., the PCI bus), and serves as a host for peripheral game controllers 104a-104d. Network interface 232 provides access to a network (e.g., the Internet, home network, etc.) and may include any of a wide variety of various wire or wireless interface components, including an Ethernet card, a telephone modem interface, a Bluetooth module, a cable modem interface, an xDSL interface, and the like.

Game console 102 has two dual controller support subassemblies 240a and 240b, and each subassembly supports two of game controllers 104a-104d. A front panel input/output (I/O) sub-assembly 242 supports the functionality of power button 112 and eject button 114, as well as any light-emitting diodes (LEDs) or other indicators exposed on the outer surface of the game console. Subassemblies 240a, 240b, and 242 are coupled to module 214 via one or more cable assemblies 244.

Eight function units 140a-140h are illustrated as being connectable to four controllers 104a-104d, i.e., two function units for each controller. Each function unit offers additional functionality or storage for games, game parameters, and other data. When an MU is inserted into a controller, the MU can be accessed by memory controller 202.

A system power supply module 250 provides power to the components of gaming system 100. A fan 252 cools the components and circuitry within game console 102. To implement the present invention, a game software application 260 comprising machine instructions stored on a DVD or other storage media (or downloaded over the network) is loaded into RAM 206 and/or caches 210 and/or 212 for execution by CPU 200. Portions of software application 260 may be loaded into RAM only when needed, or all of the software application (depending on its size) may be loaded into RAM 206. Software application 260 and the relevant functions that it performs to implement the present invention are described below in greater detail.

Gaming system 100 may be operated as a stand-alone system by simply connecting the system to a television or other display monitor. In this standalone mode, gaming system 100 enables one or more users to play games, watch movies, or listen to music. However, with connectivity to the Internet or other network, which is made available through network interface 232, gaming system 100 may be further operated as a component of a larger network gaming community, to enable online multiplayer interaction in games that are played over the Internet or other network with players using other gaming systems. Gaming system 100 can also be coupled in peer-to-peer communication with another gaming system using the network interface and an appropriate cable (not shown).

Exemplary Gaming Network for a First Embodiment

FIG. 3 shows an exemplary network gaming environment 300 that interconnects multiple gaming systems 100a, . . . 100n via a network 302. Preferably, each gaming system includes at least one corresponding headset 142a, . . . 142n and corresponding microphone 144a, . . . 144n for voice communication between players. Network 302 represents any of a wide variety of data communication networks and may include public portions (e.g., the Internet), as well as private portions (e.g., a residential or commercial local area network (LAN)). Network 302 may be implemented using any one or more of a wide variety of conventional communication configurations, including both wired and wireless types. Any of a wide variety of communications protocols can be used to communicate data via network 302, including both public and proprietary protocols. Examples of such protocols include TCP/IP, IPX/SPX, NetBEUI, etc.

In addition to gaming systems 100a, . . . 100n, one or more online services 304a, . . . 304s are accessible via network 302 to provide various services for the participants, such as serving and/or hosting online games, serving downloadable music or video files, hosting gaming competitions, serving streaming A/V files, enabling exchange of email or other media communications, and the like. Network gaming environment 300 may further employ a key distribution center 306 that plays a role in authenticating individual players and/or gaming systems 100a, . . . 100n for interconnection to one another, as well as to online services 304a, . . . 304s. Distribution center 306 distributes keys and service tickets to valid participants that may then be used to form game playing groups, including multiple players, or to purchase services from online services 304a, . . . 304s.

Network gaming environment 300 introduces another memory source available to individual gaming systems 100a, . . . 100n, i.e., online storage. In addition to accessing data on optical storage disc 108, hard disk drive 208, and function unit 140, gaming systems 100a, . . . 100n can also access data files available at remote storage locations via network 302, as exemplified by remote storage 308 at online service 304s.

It should be noted that the network gaming environment can be a closed network, providing only access to other gaming systems and the gaming environment, using for example, communication through virtual private network tunnels to provide enhanced security and limit access by other computing devices.

Exemplary System for Online Services and Server Computer

Figure 4:
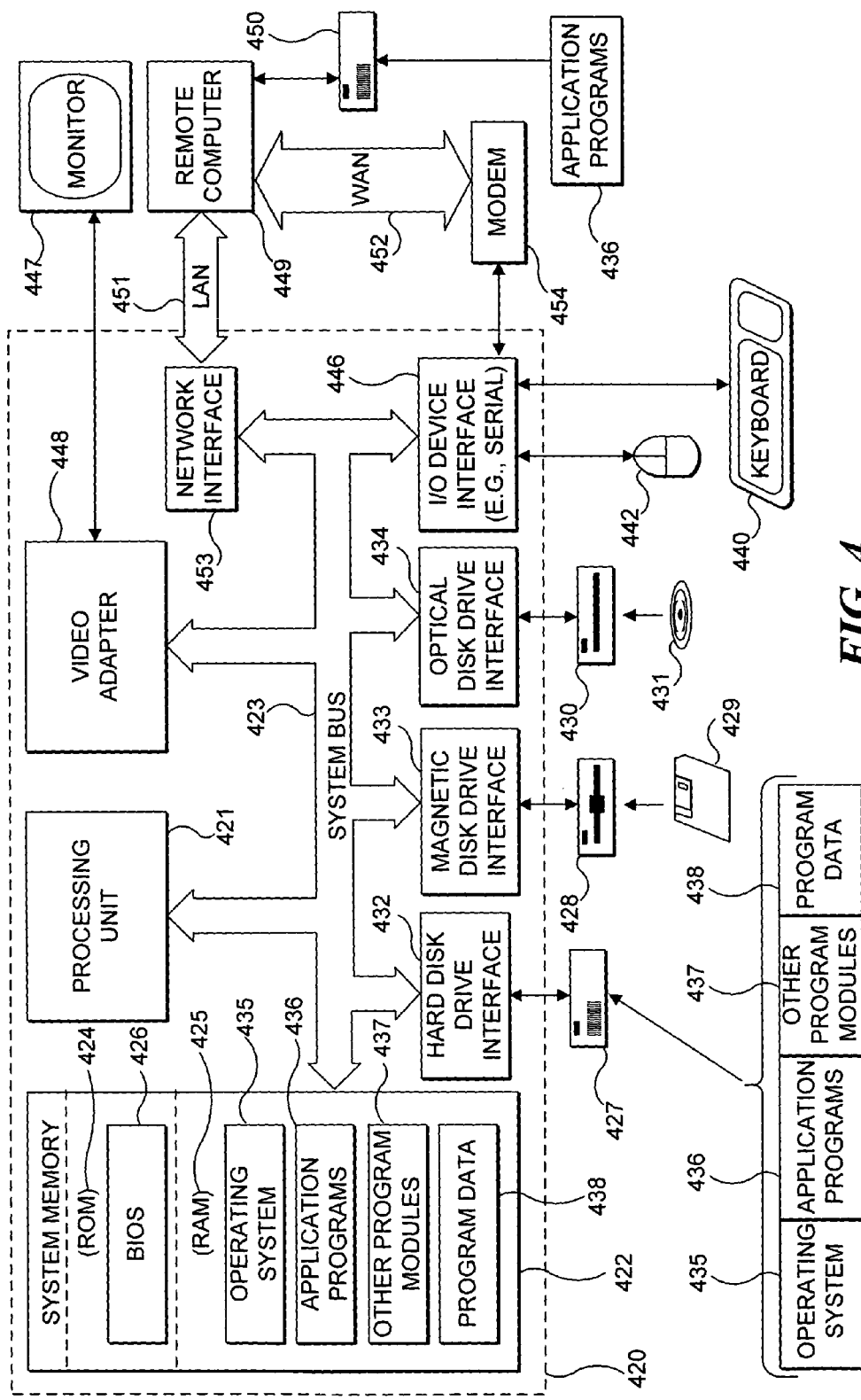
FIG. 4 is a functional block diagram of a general purpose computing device in the form of a conventional server computer for use in an exemplary system for online services.

With reference to FIG. 4, an exemplary system for online services 304a, . . . 304s in accord with the present invention includes a general purpose computing device in the form of a conventional server computer (SC) 420, provided with a processing unit 421, a system memory 422, and a system bus 423. The system bus couples various system components including the system memory to processing unit 421 and may be any of several types of bus structures, including a memory bus or memory controller, a peripheral bus, and a local bus using any of a variety of bus architectures. The system memory includes ROM 424 and RAM 425. A basic input/output system (BIOS) 426, containing the basic routines that help to transfer information between elements within SC 420, such as during start up, is stored in ROM 424. SC 420 may further include one or more of a hard disk drive 427 for reading from and writing to a hard disk (not shown), a magnetic disk drive 428 for reading from or writing to a removable magnetic disk 429, and an optical disc drive 430 for reading from or writing to a removable optical disc 431, such as a CD-ROM or other optical media. Hard disk drive 427, magnetic disk drive 428, and optical disc drive 430 are connected to system bus 423 by a hard disk drive interface 432, a magnetic disk drive interface 433, and an optical disc drive interface 434, respectively. The drives and their associated computer readable media provide nonvolatile storage of computer readable machine instructions, data structures, program modules, and other data for SC 420. Although the exemplary environment described herein employs a hard disk, removable magnetic disk 429, and removable optical disc 431, it will be appreciated by those skilled in the art that other types of computer readable media, which can store data and machine instructions that are accessible by a computer, such as magnetic cassettes, flash memory cards, digital video discs (DVDs), Bernoulli cartridges, RAMs, ROMs, and the like, may also be used in the exemplary operating environment.

A number of program modules may be stored on the hard disk, magnetic disk 429, optical disc 431, ROM 424, or RAM 425, including an operating system 435, one or more application programs 436, other program modules 437, and program data 438. A user may enter commands and information into SC 420, and provide control input through input devices such as a keyboard 440 and a pointing device 442. Pointing device 442 may include a mouse, stylus, wireless remote control, or other cursor control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other I/O devices are often connected to processing unit 421 through an I/O interface 446 that is coupled to the system bus 423. The term I/O interface is intended to encompass each interface specifically used for a serial port, a parallel port, a game port, a keyboard port, and/or a universal serial bus (USB) port. A monitor 447 or other type of display device is also connected to system bus 423 via an appropriate interface, such as a video adapter 448, and is usable to display application programs, graphic images, Web pages, and/or other information. In addition to the monitor, SCs may be coupled to other peripheral output devices (not shown), such as speakers (through a sound card or other audio interface—not shown) and printers.

SC 420 preferably operates in a networked environment using logical connections to one or more remote computing devices, such as a remote computer 449, or gaming systems like that described above. Remote computer 449 may thus be another SC, a game console, a personal computer (which is typically generally configured much like SC 420), a router, a network PC, a peer device, or a satellite or other common network node, and typically includes many or all of the elements described above in connection with SC 420, although only an external memory storage device 450 has been illustrated in FIG. 4. As also described above with regard to network 302 of FIG. 3, the logical connections depicted in FIG. 4 include a local area network (LAN) 451 and a wide area network (WAN) 452. Such networking environments are now relatively common in homes, and very common in offices, enterprise wide computer networks, intranets, and the Internet.

For use in a LAN networking environment, SC 420 is connected to LAN 451 through a network interface or adapter 453. When used in a WAN networking environment, SC 420 typically includes a modem 454, or other means such as a cable modem, DSL interface, or an Integrated Service Digital Network (ISDN) interface for establishing communications over WAN 452, such as the Internet. Modem 454, which may be internal or external, is connected to the system bus 423 or coupled to the bus via I/O device interface 446; i.e., through a serial port. In a networked environment, program modules depicted relative to SC 420, or portions thereof, may be stored in the remote memory storage device. It will be appreciated that the network connections shown are exemplary and other means of establishing a communications link between the computers/computing devices may be used, such as wireless communication and wide band network links.

Core Concepts Applicable to Both the First and Second Embodiments

As shown in FIG. 5, a network 510 includes a server 512 and clients 514, 516, and 518. Server 512 provides a trusted environment by controlling the clients allowed to access sessions hosted by the server. Server 512 may be operated as a subscription service in which each client pays a fee for access to sessions hosted by the server. Alternatively, clients may not be charged for access to sessions, but are required to enroll in each session, such that the server controls which clients have access to each session hosted by the server. For example, in an enrollment process, a client may have to agree to a community policy, such as refraining from engaging in sexually related communications with other clients in a peer-to-peer context. If other clients report abuses of this policy, the offending client may thereafter be banned from the server. The server may operate a plurality of sessions, and may restrict clients' access only to certain sessions. For example, server 512 may simultaneously host a teen session, a hobby session emphasizing model trains, and an adult session with greater latitude regarding sexually explicit communications between clients. Clients under 18 years of age who enroll are allowed access to the teen session and the hobby session, but not to the adult session. Adult client enrollees can also opt out of the adult session if they desire. When server 512 is a game server, a plurality of different sessions corresponding to different games and game play at different levels of difficulty may be available.

One key concept of the present invention is that by controlling access to sessions hosted by the server, clients who violate codes of conduct established by the server can be banned from future sessions. Violations can occur in several contexts. A client may post a request on the server to engage in peer-to-peer communications relating to a topic not supported by the server (e.g., such as a sexually or politically related topic). The server can remove the posting and bar that client from accessing the server in the future. In another context, the client may engage in offensive or harassing communications with other clients in a peer-to-peer context. The server can collect feedback from other clients about such behavior, and ban offensive clients as required. Commonly assigned U.S. patent application Ser. No. 10/151,793, entitled "Automatic Feedback and Player Denial" discloses a system and method for collecting feedback about players' behavior in an online gaming environment. The system and method described therein can be employed to collect feedback regarding the clients of server 512, and to bar clients as required.

The sessions hosted by server 512 can vary widely. As described above, in the first embodiment, an important functionality of the server is not to facilitate peer-to-peer communication, but instead, to carryout another function, such as hosting online games. In this embodiment, establishing peerto-peer communication between clients (players) enhances the gaming experience. In the second embodiment, a core function of the server to is enable clients to find other clients who wish to establish peer-to-peer communications. Regardless of which embodiment is implemented, server 512 provides a trusted environment in which the server exerts control over the clients that are allowed access to sessions enabled by the server.

It should be understood that server 512 can be implemented using a number of different hardware configurations. Server 512 can be implemented as a single computing platform, or as a plurality of computing platforms cooperatively functioning together. The term "server" is not intended to be limiting to only a single computing device, but instead is more broadly intended to encompass a plurality of computing devices performing the functions of the "server," as described herein.

Referring once again to FIG. 5, clients 514, 516, and 518 each have established a server/client connection 520 with server 512. Based on information provided by server 512, client 514 has established a peer-to-peer connection 522 with client 516. Client 518 has similarly established a peer-to-peer connection 522 with client 516.

FIG. 6 is a flow diagram 610 that generally shows the logic for using a server to provide a secure environment within which peer-to-peer communications between clients are facilitated by the server. The logic begins in a block 612, and in a block 614, the server authenticates and authorizes each client attempting to access a session hosted by the server to join the session. In a block 616, the server supplies a client with a list including other authorized clients currently accessing a session. Under some circumstances, it may be desirable to include clients who desire peer-to-peer communications but are not currently involved in a session; however, under most circumstances, each client in such a list will be logged onto the server, online, and able to establish peer-to-peer communications. While the list could include only a single client, the list will typically include a plurality of clients.

The manner in which the list is presented to clients can vary widely. The contents of the list can also be configured in a variety of ways. For example, when the server is a game server, the list may be restricted to only those clients who are members of the first client's "team," and thus, the list may not include all clients participating in a session. In the context of a server whose main functionality is to facilitate peer-to-peer communications between clients, the list can be based on authorizations associated with a specific client. Consider a server hosting an adult session, a teen session, and a hobby session. Based on the age of the first client, the list may not include any clients from the adult session. Particularly in the context of a server dedicated to facilitating peer-to-peer communications, it would be desirable to enable clients to narrowly define the list, so as to identify other clients sharing particular interests. For example, the first client may be old enough to participate in adult sessions, but may really only want to communication with hobbyists in the same geographical area in which the client resides. The list provided by the server would then be limited by topic and geography. Those of ordinary skill in the art will recognize that many other variations are possible.

Referring once again to flow diagram 610, in a block 618, the first client is enabled to select a second client from the list. The server then transmits connection information for the second client to the first client, as indicated in block 620. Such connection information minimally includes information required by the first client to establish a peer-to-peer communication with the second client. For example, the external IP address of the second client will be included. If the second client is associated with an internal IP address (for example on a shared Internet connection network), and/or a specific port address, that information will also be included. Preferably, the information will also include a user key provided by the server, so that when the second client receives a request to establish the peer-to-peer connection with the first client, the fact that the first client has the user key assigned to the second client by the server indicates that the first client is trusted by the server.

In a block 622, the first client uses the connection information regarding the second client received from the server to attempt to establish a peer-to-peer communication with the second client. A decision block 624 determines whether that attempt was successful. If so, the connection is maintained until broken by one of the participants (or by a network failure), as indicated in a block 626. If the attempt was not successful, the server transmits the first client's connection information to the second client, as indicated in a block 628. In a block 630, the second client uses the first client's connection information to attempt to establish a peer-to-peer communication link with the first client. A decision block 632 determines whether that attempt was successful. If so, the connection is maintained until broken by one of the participants (or by a network failure), once again as indicated in a block 626. The logic ends in a block 636. Note that if the second attempt to establish a peer-to-peer communication link is unsuccessful, the logic may loop back to block 618, so that the server once again sends the second client's connection information to the first client (as indicated by the dashed line coupling decision block 632 to block 618), or the server could optionally route the voice traffic (or other communication between the clients) through the server as indicated by an optional block 634. Yet another option if the peer-to-peer connection is not established in block 630 is to simply indicate that the attempted communication was unsuccessful, and to terminate the logic at block 636.

Details Relating to a Game Server Implementation of the First Embodiment

FIG. 7 is based on FIG. 5 and illustrates how the concepts of the present invention are applied in the context of an online gaming environment. A network 710 includes a massively multi player game server 712, and players 714, 716, 718, and 719. As indicated in FIG. 7, in a preferred implementation, each client is a player using a game console such as that described above in conjunction with FIGS. 1 and 2. Those of ordinary skill in the art will recognize that each player in FIG. 7 could be accessing the game server using a different type of gaming device, or a personal or laptop computer.

Each player accesses a gaming session hosted by game server 712 using server/client connections 720. Based on information provided by server 712, player 714 has established a peer-to-peer connection 722 with player 716. Player 714 has similarly established a peer-to-peer connection 722 with player 718.

In the context of gaming network 300, each player 714-719 is preferably using game console 102, which as described above, can support up to four players. Thus, FIG. 7 is somewhat simplistic, because each client/player shown in FIG. 7 could actually include up to four individual players, each of whom is enabled to establish peer-to-peer communications with selected individual players using other game consoles. Preferably, a single connection is made from each network entity (i.e. each game console or each computer), and every player on that entity will use the same peer-to-peer connection. FIG. 8 provides additional details explaining how game console 102 supports communications between 11 players in a session. In referring to FIG. 8, it should be understood that while game console 832 (i.e. GAME CONSOLE 2) as shown is supporting two players, and game console 836 (i.e. GAME CONSOLE 3) as shown is supporting a single player, each game console in FIG. 8 can support up to four players. Thus while only 11 players are communicating in a session as indicated in FIG. 8, communication among up to 16 players (two more players on game console 832, and three more players on game console 836) can be supported in such a configuration.

The ability to include voice chat is important in the example shown, because players using game console 102 will not have keyboards with which to type messages. While game designers developing game titles for use with game console 102 can provide many different functionalities with respect to supporting voice chat, voice chat using game console 102 preferably will include the following functions.

Players should also be able to mute their own voice so they will never by heard by others.

Players should have the ability to mute other players from talking to them during a game.

Players should have the ability to mute other players from talking to them during any future game, such that permanently muting a player makes sure that you never talk to that person again.

A person's voice can reveal details about a person that would not normally be revealed by text chat, including identifying characteristics such as gender and age. Therefore, the player should have the ability to mask their voice. It is a recommended practice to allow users to listen to themselves with the voice mask applied. Preferably voice masking is turned on by default, and can be turned on or off at any time by the user.

In games played on game console 102, player may optionally (as determined by the game designer) be permitted to change their voice to match their onscreen character, such as a dragon or an elf in a fantasy based role playing game.

FIG. 8 illustrates details showing how a game console 810 supports voice chat. To maintain quality voice chat, the voice chat session must be updated by the game title at a consistent rate. Just as a game must maintain a regular video frame rate, a regular voice frame rate must also be maintained. If not, the voice quality will deteriorate, as will the user's experience. Game console 810 is optimized to perform voice chat well in various commonly encountered scenarios. The primary limiting factor is the number of encodes and decodes that can be done per voice frame. It should be understood that game console 810 is generally identical to game console 102. As described above, game console 102 includes audio processing unit 224 and audio CODEC 226. In game console 810, audio processing unit 224 and audio CODEC 226 have been separated into additional functional blocks to more clearly explain the audio processing implemented. For example, audio CODEC 226 as described in conjunction with game console 102 includes both an encoder and a decoder, but the encoder and decoder are shown as separate functional blocks in game console 810, to more clearly describe the audio signal processing that occurs during voice chat. Audio processing unit 224 (described in conjunction with game console 102) includes a plurality of network queues 816a, 816b, and 816c; preferably one queue for each connection with a different network entity, as any network latency that exists is between entities. An input router 826 and an output router 820 that are required and not specifically discussed with respect to game console 102 are shown in FIG. 8. Game console 810 has been designed to simultaneously reliably support up to 16 talkers (i.e., up to four game consoles linked via a network, with up to four talkers per game console). Game console 810 preferably is capable of encoding and decoding a defined amount of data per voice frame to support a smooth game frame rate.

Game console 810 includes inputs 824a-824d configured to receive an audible voice stream for each player 828a-828d from a microphone on each player's headset. Inputs 824a-824d are coupled to input router 826, which is configured to determine which players are enabled to talk, and forwards only the voice streams corresponding to players enabled to talk. The forwarded voice streams are received by an encoder 814, which is logically coupled with input router 826. Encoder 814 compresses audible speech into voice data that can be sent over network 830 to receiving game consoles 832, 836, or 840 as required. Also, encoder 814 is logically coupled with a network layer 812, which is responsible for sending game and voice traffic through a network 830.

Game console 810 includes a network queue for each other game console linked with game console 810 via network 830. Preferably, game console 810 is capable of communicating with up to three other game consoles (i.e., with consoles 832, 836, and 840). Thus, game console 810 is able to allocate sufficient memory and processing resources to establish three network queues 816a, 816b, and 816c. Preferably there is a single queue on the receiving entity for each network entity sending data. Game console 836 supports only one player 838, and network queue 816b will queue only data from player 838. Network queue 816c requires more resources, because network queue 816c receives data from game console 840, which supports four players 842a-842d. Network queues remove the "jitter" effects caused by the difference in arrival times of packets sent over the Internet or other interconnecting network. The network queues store voice data as it comes in and smooth the playback of the voice data so the listener does not hear "pops" caused by any delay of the voice packet propagating through the network.

Each network queue is logically coupled with a decoder 818. The algorithms controlling encoder 814 and decoder 818 are complimentary. Decoder 818 is logically coupled with output router 820, which receives decoded, audible streams and sends them to the correct output object per player. Thus, output router 820 is logically coupled with outputs 822a-822d, which provides audio streams to the appropriate ones of players 828a-828d. Each output is responsible for mixing all appropriate streams and sending them to the appropriate player's headset.

When analyzing what is required to support voice chat with game console 810, it helps to break down game based voice chat into three primary scenarios. In a Point-to-Point scenario, there is one person chatting per game console and two game consoles. In a Multipoint scenario, there is one person chatting per game console and up to 16 game consoles. Finally, in a Multiplayer on MultiGame Console scenario, there are up to four talkers per game console, and up to four game consoles. Most games will fit into one of these scenarios.

Point-to-Point corresponds to a single-player on one game console talking to another single-player on another console. A common example is a game like chess where there are only two players, and the players desire to communicate while playing. In this case, each game console instantiates one encoder and one decoder. During the voice frame update, each game console updates any encoding and any decoding, as necessary. Muting, in this case, is handled by simply not decoding a muted player's voice stream.

In the Multipoint Scenario, there is one player on each game console, but multiple game consoles in the session. An example would be a four player bridge game that only allows a single player per console. The game can decide if all players talk to everyone, or if there are teams, can determine if a subset of players may talk to each other. In this case, each game console instantiates one encoder and one 4-in-1 decoder. During the voice frame update, each game console updates any encoding (for the single user on the game console) and any decoding (up to three from the other game consoles). The 4-in-1 decoder is implemented as a multi-stream parallel decoder that can take multiple input streams, combine them in the frequency domain and then perform a single operation on the combination to transform it into back into one output stream. This optimization allows separate operations on each single stream to be more efficiently combined into a single operation applied to all streams after they are combined.

For the Multiplayer on MultiGame Console scenario, each game console allows multiple players and multiple game console consoles may be connected. An example would be a 16 player game that allows up to four players on each console and up to four consoles.

The game designer can decide if all players are able to talk with each other, or if there are teams so that only a subset of players may talk to each other. With 16 players, it is preferable to limit the number of people who can talk at the same time (e.g., to only four people) so the conversation does not become unintelligible.

Instantiating and processing one encoder and four 4-in-1 decoders per player per voice frame in each game console would likely overwhelm the processor in each game console. However, the following assumptions are made to manage the situation.

- Assume that hearing more than four talkers at once is unwieldy and undesired. This assumption is used to limit the number of voices decoded at one time. A preferred algorithm selects the four "loudest" voices per listener on the game console. Thus, a worst case scenario would be two listeners on a game console, each hearing four (possibly unique to that listener) other talkers at once.
- Assume that when encoding, a voice frame may be duplicated if there is no time to actually encode a voice. Based on this assumption, all four voices could be handled in each voice frame by using two encoders and a "round-robin" system (described below).
- A voice "channel" is simply used like a channel on a 2-way radio—all talkers on a channel can hear each other (before individual muting is taken into account). When a player who will chat enters a session, the player must explicitly set the channel they are on. Typically, a channel would be used to enable all members of a "team" to talk to each other (as a default, one channel could be used for all players in the game). Channels can be used to optimize network traffic for voice.
- Titles that choose to use additional processor power will have the option of having additional decoders available, which may permit additional voices to be heard simultaneously during a voice frame.

Thus, in the Multiplayer on MultiGame Console scenario, each game console instantiates one 4-to-4 decoder. During the voice frame update, each game console updates any encoding (for the up to four users on the game console) and any decoding (up to four from the other game consoles). If more than four different voice streams are available during this voice frame, the four loudest are selected for decoding. If the game designer has chosen to permit more processing power to be used for chatting, additional decoders can be instantiated to increase the number of multiple voice streams decoded per frame.

Encoding with only two encoders (meaning four encoder instances, but only two working at a voice interval) works as follows. Assume that players 1, 2, 3, and 4 all talk at the same time and that a history is maintained of the last two voices that were encoded. The current microphone packet is analyzed for player 1's voice, and if present, it is encoded. The current microphone packet is next analyzed for player 2's voice, and if present, it is encoded. The process halts and the history is updated as {3, 4, 1, 2}. During the next microphone interval (normally 40 microseconds) the microphone packet is analyzed for players 3 and 4 (i.e., the two player that were not processed in the previous microphone packet). If the microphone packet is analyzed and player 3's voice is not found, no encoding is performed. If player 4's voice is found, encoding is performed, and the history is updated to {3, 1, 2, 4}. During the same microphone packet, player 1's voice is encoded if present, and the history becomes {3, 2, 4, 1}. During the microphone packet interval, the analysis looks for voice from players 3 and 2. If player 3 still does not have voice, encoding is performed for player 2 and player 4, and the history is updated to {3, 1, 2, 4}.

The round robin encoding method only operates on two frames of speech at a time and repeats the other frames of those streams it is not currently encoding. The end result is a degradation of sounds when all four players talk, but no more processing power is used during that time.

Exemplary Method for the First Embodiment

FIG. 9 is a flow diagram 910 illustrating the logic used by a game server to facilitate peer-to-peer communication among players during game play, in accord with a preferred implementation of this embodiment of the present invention. The logic begins in a block 912, and in a block 914, the communication controls for a particular game are set according to standards developed for the game console employed (e.g., game console 102). Based on the standards, the types of communication that will be supported by a particular game (such as text only, text and voice, canned voice responses selectable by a menu, or real-time voice) are supported, as indicated in a block 916. The steps associated with blocks 914 and 916 are implemented by the designer of the game, as indicated by dash line 913, which encompasses blocks 914 and 916.

The game server is then able to host gaming sessions based on the game parameters that were thus set, as indicated in a block 918. Each player accessing the gaming session hosted by the game server is authenticated and authorized by the game server in a block 920. The game server must not only identify each game console accessing the game server, but also each individual player served by a particular game console, as indicated in a block 922. Preferably, the game server assigns each individual player a user key at logon, and that user key is then subsequently used to facilitate the establishment of peer-to-peer communications between players that are trusted by the game server.

In a block 924 the server enables players to establish peer-to-peer communications links with one another as desired. Specific details related to block 924 are provided in FIG. 10, as discussed below. Game play with peer-to-peer communication between players enabled continues for as long as desired, as indicated in a block 926. The logic terminates at an end block 928 when a player exits the gaming environment.

In a flow diagram 1010 in FIG. 10, the game server facilitates the establishment of peer-to-peer communications between players by providing each player a list of other players, as indicated in a block 1012. This list will typically be limited to players on the same team, or players within the game world in sufficiently close proximity to each other such that communications between the players is desirable and realistic within the game environment. In a block 1014, the server enables the player identified as CONSOLE1-P1 (i.e., a first player using a first game console to access the game server) to select the player identified as CONSOLE2-P4 (i.e., a fourth player using a second game console to access the game server) for voice communication. This selection can be facilitated by displaying a scrollable list of other players, such that CONSOLE1-P1 can scroll through the list and select CONSOLE2-P4.

The server then provides CONSOLE1-P1 with connection information for CONSOLE2-P4, as indicated in a block 1016. The information includes the external IP address of CONSOLE2, the internal IP address of CONSOLE2 (if it has an internal address), and the number of the port to which the fourth player of CONSOLE2 is connected. Preferably, the server also sends CONSOLE1-P1 the user key assigned to CONSOLE2-P4 when CONSOLE2-P4 logged onto the game server, so that when CONSOLE2-P4 receives a request from CONSOLE1-P1 to establish a peer-to-peer connection, CONSOLE2-P4 recognizes CONSOLE1-P1 as being trusted by the game server. If CONSOLE1-P1 was not trusted, the game server would not have allowed CONSOLE1-P1 access to CONSOLE2-P4's user key. In a block 1018, CONSOLE1-P1 attempts to establish a peer-to-peer communications link with CONSOLE2-P4; this step is automatically performed by game console CONSOLE1.

A decision block 1020 determines whether the attempt was successful. If a peer-to-peer communication link between CONSOLE1-P1 and CONSOLE2-P4 was established, the connection is maintained until broken by one of the players (or by a network failure), as indicated in a block 1024. If the attempt was not successful, the game server transmits the first player's (i.e., CONSOLE1-P1's) connection information to the second player (i.e., to CONSOLE2-P4), as indicated in a block 1022. As discussed above with respect to FIG. 6, if the second attempt to establish a peer-to-peer communication link is unsuccessful, the logic can either loop back to block 1016, so that the game server once again sends the second player's connection information to the first player, or the game server can route all the communication between players through the game server, or the game server can indicate the failure to connect in the peer-to-peer relationship.

Details Relating to the Second Embodiment

FIG. 11 shows an exemplary network 1110 that includes servers 1114a-1114s, whose main function is facilitating the establishment of peer-to-peer connections among clients. In a preferred implementation of this embodiment of the present invention, the servers are configured to recognize different classes of clients, who may have different access rights to the hosting servers.

The embodiment shown in FIG. 11 makes public Internet directories of clients seeking to establish peer-to-peer communications amongst themselves tractable by providing different "classes" of entities (anonymous users, authenticated users, businesses, universities, etc) different access policies that can be enforced in a secure fashion. For example, the servers are configured such that when an anonymous user 1116 connects to a server, the server only allows anonymous user 1116 to access Session 1 being hosted by the servers. Session 1 can be configured in a number of different ways. Each client accessing Session 1 may represent advertisers operating websites who wish to attract traffic to their sites. Thus, anonymous user 1116 would only be able use network 1110 to access such websites, as opposed to being able to obtain connection information on individuals desiring peer-to-peer communications. Alternatively, Session 1 may include clients who have expressed a preference for establishing peer-to-peer communications with little or no restrictions.

The servers in network 1110 are also configured to recognize limited authenticated users, such that when limited authenticated user 1118 accesses the server, access to Session 1 and Session 2 is provided. Thus, limited authenticated user 1118 has access to clients to whom anonymous user 1116 does not have access (i.e., those clients accessing Session 2). The servers are further configured to recognize authenticated users, who have been granted still different access rights. An authenticated user 1120 may be allowed to access Session 1, Session 2, or Session 3, where Session 3 provides still other options. Network 1110 also includes listing entities 1122a and 1122b, who are allowed by the servers to advertise their connection to other clients.

Preferably each client who wants to connect to the communication network has to be authenticated and authorized. Authentication and Authorization (A&A) can be based on web site sign in such as with Microsoft Corporation's Passport, with public-key cryptography employing certificates with a hierarchy of trust, or with secure protocols such as Kerberos (RFC 1510), which use a Trusted Authority (TA) to grant "tickets." Any of these mechanisms, or combinations of these mechanisms, are useful in connection with this aspect of the present invention.

Authentication is the process of confirming the identity of the client attempting to access the server. Authentication can be achieved by offering secure credentials such as a user-name/password combination, or possession of a Smart Card and/or password that is associated with the client. Authentication can also rely upon some entity that can "vouch" for the client. For example, when a new client enrolls with the servers to gain access to other clients, authentication can be achieved using a credit card, a root certificate authority, or other third party trusted authority.

Authorization gives a client permission to use the service (or subsets of the service). In FIG. 11, anonymous user 1116, limited authenticated user 1118, and authenticated user 1120 each have been assigned different authorizations. Once a client has been authenticated, that client's authorization data include permissions to access the service and different subset(s) of the service (i.e. Session 1, Session 2, and/or Session 3). Authorization allows access and enforces policies. The policies of the directory may be determined by the designer of a service, can vary broadly. For example, in network 1110, preferably anonymous users are not required to authenticate, and Session 1 is only a very limited subset of the service. Anonymous Users generally will be allowed to browse limited public-facing listing entities (i.e., advertisers, companies and/or universities) that accept anonymous connections (similar to accessing the Yellow Pages). The connection type for anonymous connections is decided by the listing entity and may be limited to only one-way communication, such as listening, viewing, and reading online content.

Limited Authenticated Users, such as user 1118 in FIG. 11, are those who have proven their identity by providing secure credentials. Limited Authenticated Users may view and connect to limited public-facing listing entities and may also be allowed to have two-way communication with those entities. They may also report violations of entities who list improper content.

Authenticated Users (i.e., user 1120 in FIG. 11) are those who have proven their identity by providing secure credentials, and who also have a business relationship with the enterprise authorizing authority, and thus have been granted a superset of authorizations that allow them greater access than the Limited Authenticated Users. Authenticated Users have all of the permissions of Limited Authenticated Users, but can also access additional sessions, such as those including clients desiring more secure communications (e.g., access to an intranet company directory).

Preferably, Listing Entities are those who can advertise their connection to any of the Anonymous Users, Limited Authenticated Users, and Authenticated Users. Listing Entities may be individuals, businesses, churches, universities, and other organizations. Listing Entities are able to set their access based upon sets of users. For example, a Listing Entity offering customer support may allow Anonymous Users to get automated help from a computer, limited customer support representative time for Limited Authenticated Users, and Premier Support for Authenticated Users who have a support contract with them.

Although the present invention has been described in connection with the preferred form of practicing it and modifications thereto, those of ordinary skill in the art will understand that many other modifications can be made to the present invention within the scope of the claims that follow. For example, speakers can be visually identified within a local network of gaming systems independent of a networked gaming service. Furthermore, the decision steps implemented in the logical flow and discussed above may be arranged in other configurations. Accordingly, it is not intended that the scope of the invention in any way be limited by the above description, but instead be determined entirely by reference to the claims that follow.

The invention in which an exclusive right is claimed is defined by the following:

1. A method for enabling players in a multiplayer game to communicate with each other in a peer-to-peer network connection, in which communications of the peer-to-peer network connection bypass a game server hosting the multiplayer game, and so as to reduce a workload of the game server hosting the multiplayer game, the method comprising:
   a game server hosting a multiplayer game session;
   requiring each person requesting to play in the multiplayer game session to first enroll in a game service operated by the game server;
   authenticating each player attempting to play in the multiplayer game by determining if each corresponding player is enrolled in the game service and by checking credentials of each corresponding player attempting to play in the multiplayer game to verify that each corresponding player is authenticated by the game server, so that only persons who have enrolled in the game service and that have approved credentials are allowed to access the multiplayer game session as a player, wherein having approved credentials resulting from an enrollment process further comprises each player having agreed to a community policy to refrain from engaging in sexually explicit communications;
   providing a first player that is authenticated with the game server and that has accessed the multiplayer game session a list identifying at least one other player that is both authenticated and that is currently accessing the multiplayer game session and that is enabled to communicate with the first player in a peer-to-peer network connection initiated by the first player, wherein the list of at least one other player includes the other players that are authorized and have agreed to abide by the community policy;
   receiving a request from the first player selecting a second player from the list which lists said at least one other player that is both authenticated with the game server and that is currently accessing the multiplayer game session, wherein the request from the first player is a request from the first player for communication information corresponding to the second player and that is required to establish the peer-to-peer connection between the first player and the second player and that includes at least an IP address of the second player;
   in response to the request, transmitting the communication information comprising at least the IP address corresponding to the second player from the game server to the first player, wherein the first player, upon receiving the communication information, initiates the peer-to-peer communication with the second player by using the received communication information, the peer-to-peer communication comprising a voice communication; and
   in response to receiving a notification from the first player indicating that the second player communicated to the first player a communication that violates the community policy, removing the second player from the list such that the second player is prohibited from playing multiplayer games hosted on the game server.

2. The method of claim 1, wherein authenticating each player attempting to access the multiplayer game comprises assigning each player a unique user key, and wherein transmitting information about the second player from the server to the first player comprises transmitting the second player's unique user key to the first player, which is used by the first player in the attempt to open the peer-to-peer connection with the second player, thereby assuring the second player that the first player's attempt to open the peer-to-peer communication comes from a trusted player participating in the multiplayer game hosted by the game server.

3. The method of claim 1, wherein if after receiving the communication information about the second player, the first player is unsuccessful in the attempt to establish the peer-to-peer communication with the second player, the method further comprises:
   (a) notifying the game server that the attempt by the first player to establish the peer-to-peer communication has failed;
   (b) transmitting information about the first player from the game server to the second player, the information being required for enabling the peer-to-peer communication to be established between the first player and the second player; and
   (c) requesting the second player to establish the peer-to-peer communication with the first player.

4. The method of claim 3, wherein if after receiving information about the first player, the second player is unable to establish the peer-to-peer communication with the first play, the method farther comprises routing each communication between the first player and the second player through the game server.

5. The method of claim 1, wherein the list is limited to players on a same team.

6. The method of claim 1, wherein the list is limited to players playing a game within a same game world and within a predetermined proximity within a virtual environment of the game world.

7. The method of claim 1, the communication information includes a specific port address.

8. The method of claim 1, the IP address comprises an internal IP address associated with a shared Internet connection.

9. The method of claim 1, wherein the list further includes at least one other player that is both authenticated with the game server and that is currently not accessing the multiplayer game session.

10. A computer readable storage media having stored machine instructions for implementing a method comprising:

hosting a multiplayer game session by a game server;

requiring each person requesting to play in the multiplayer game session to first enroll in a game service operated by the game server;

authenticating each player attempting to play in the multiplayer game by determining if each corresponding player is enrolled in the game service and by checking credentials of each corresponding player attempting to play in the multiplayer game to verify that each corresponding player is authenticated by the game server, so that only persons who have enrolled in the game service and that have approved credentials are allowed to access the multiplayer game session as a player, wherein having approved credentials resulting from an enrollment process further comprises each player having agreed to a community policy to refrain from engaging in sexually explicit communications;

providing a first player that is authenticated with the game server and that has accessed the multiplayer game session a list identifying at least one other player that is both authenticated and that is currently accessing the multiplayer game session and that is enabled to communicate with the first player in a peer-to-peer network connection initiated by the first player, wherein the list of at least one other player includes the other players that are authorized and have agreed to abide by the community policy;

receiving a request from the first player selecting a second player from the list which lists said at least one other player that is both authenticated with the game server and that is currently accessing the multiplayer game session, wherein the request from the first player is a request from the first player for communication information corresponding to the second player and that is required to establish the peer-to-peer connection between the first player and the second player and that includes at least an IP address of the second player;

in response to the request, transmitting the communication information comprising at least the IP address corresponding to the second player from the game server to the first player, wherein the first player, upon receiving the communication information, initiates the peer-to-peer communication with the second player by using the received communication information, the peer-to-peer communication comprising a voice communication; and in response to receiving a notification from the first player indicating that the second player communicated to the first player a communication that violates the community policy, removing the second player from the list such that the second player is prohibited from playing multiplayer games hosted on the game server.

11. A networked game system for providing a gaming environment in which only authorized players are permitted to establish peer-to-peer communication with other authorized players during game play, thereby enhancing game play without requiring resources from the networked game system to manage ongoing communication between players, comprising:

a processor; and a memory in communication with the processor, said memory storing machine instructions that cause the processor to implement a method comprising:

hosting a multiplayer game session by a game server;

requiring each person requesting to play in the multiplayer game session to first enroll in a game service operated by the game server;

authenticating each player attempting to play in the multiplayer game by determining if each corresponding player is enrolled in the game service and by checking credentials of each corresponding player attempting to play in the multiplayer game to verify that each corresponding player is authenticated by the game server, so that only persons who have enrolled in the game service and that have approved credentials are allowed to access the multiplayer game session as a player, wherein having approved credentials resulting from an enrollment process further comprises each player having agreed to a community policy to refrain from engaging in sexually explicit communications;

providing a first player that is authenticated with the game server and that has accessed the multiplayer game session a list identifying at least one other player that is both authenticated and that is currently accessing the multiplayer game session and that is enabled to communicate with the first player in a peer-to-peer network connection initiated by the first player, wherein the list of at least one other player includes the other players that are authorized and have agreed to abide by the community policy;

receiving a request from the first player selecting a second player from the list which lists said at least one other player that is both authenticated with the game server and that is currently accessing the multiplayer game session, wherein the request from the first player is a request from the first player for communication information corresponding to the second player and that is required to establish the peer-to-peer connection between the first player and the second player and that includes at least an IP address of the second player;

in response to the request, transmitting the communication information comprising at least the IP address corresponding to the second player from the game server to the first player, wherein the first player, upon receiving the communication information, initiates the peer-to-peer communication with the second player by using the received communication infonnation, the peer-to-peer communication comprising a voice communication; and in response to receiving a notification from the first player indicating that the second player communicated to the first player a communication that violates the community policy, removing the second player from the list such that the second player is prohibited from playing multiplayer games hosted on the game server.

12. The system of claim 11, wherein the information includes a unique user key that is assigned to the second authorized player by the game system, and which is used by the first player in the attempt to open the peer-to-peer connection with the second player, thereby assuring the second authorized player that the first player's request to open the peer-to-peer communication comes from a trusted player.

13. The system of claim 11, wherein the machine instructions further cause the processor to carry out the functions of:

(a) upon receiving a notification that an attempt by the first authorized player to establish the peer-to-peer communication with the second authorized player has failed, providing the second authorized player with information about the first authorized player, the information including any address required to enable the peer-to-peer communication to be established between the first authorized player and the second authorized player; and (b) requesting the second authorized player to establish the peer-to-peer communication with the first authorized player.

* * * * *

UNITED STATES PATENT AND TRADEMARK OFFICE
CERTIFICATE OF CORRECTION

| | | |
|---|---|---|
| PATENT NO. | : 7,464,272 B2 | Page 1 of 1 |
| APPLICATION NO. | : 10/671397 | |
| DATED | : December 9, 2008 | |
| INVENTOR(S) | : Damon V. Danieli | |

It is certified that error appears in the above-identified patent and that said Letters Patent is hereby corrected as shown below:

In column 20, line 59, in Claim 4, delete "farther" and insert -- further --, therefor.

In column 22, line 55, in Claim 11, delete "infonnation," and insert -- information, --, therefor.

Signed and Sealed this
Tenth Day of May, 2011

David J. Kappos
*Director of the United States Patent and Trademark Office*